United States Patent Office 3,375,704
Patented Apr. 2, 1968

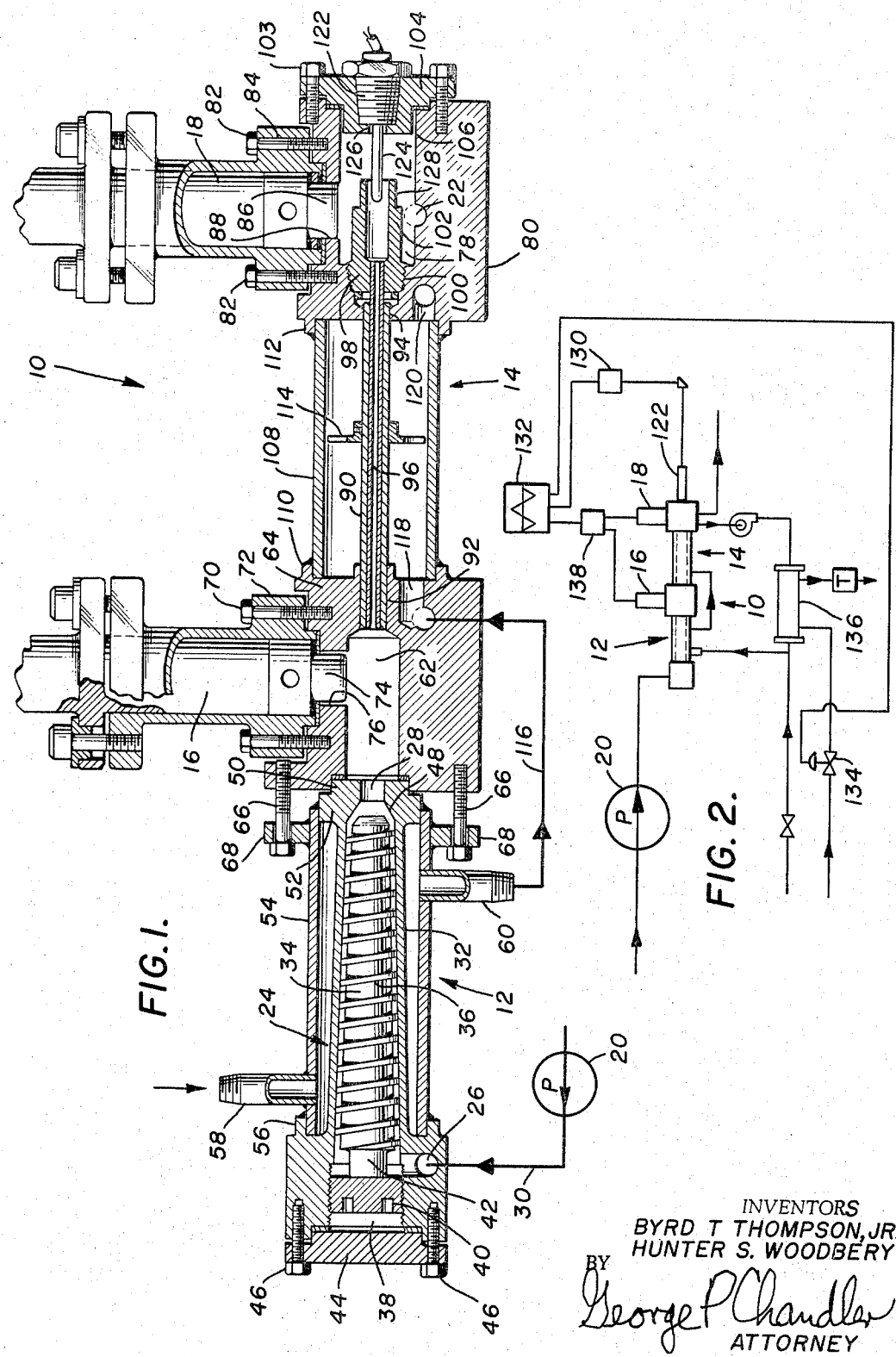

3,375,704
CONTINUOUS DIFFERENTIAL VISCOMETER
Byrd T. Thompson, Jr., and Hunter S. Woodbery, Decatur, Ala., assignors to Monsanto Company, St. Louis, Mo., a corporation of Delaware
Filed Oct. 11, 1965, Ser. No. 494,801
7 Claims. (Cl. 73—55)

ABSTRACT OF THE DISCLOSURE

A continuous viscometer wherein a pair of pressure chambers at the opposite ends of a capillary through which a fluid flows are provided with flush-mounted pressure sensors which determine the pressure drop across the capillary.

---

This invention relates to apparatus for automatically and continuously determining the viscosity of a liquid, and more particularly relates to apparatus for automatically and continuously determining the viscosity of ultra-viscous synthetic fiber dopes.

Automatic and continuous viscometers utilizing Poiseuille's pressure drop equation and maintaining all factors constant except the differential pressure across an orifice, have been used with relatively free-flowing fluids. An example of such a device is shown in the patent to Jones, Jr., No. 3,024,642 in which the viscosity of lubricating oil is measured. Where high viscosity liquids such as synthetic fiber dopes are involved, however, such apparatus does not perform in a satisfactory manner since it is susceptible to plugging due to its many tortuous passageways.

Inasmuch as prior to the instant invention no satisfactory method for continuously and automatically measuring the viscosity of thick, relatively slow flowing materials was known, a method known as the "ball fall" has been utilized. In this method viscosity was calculated from the extent of gravity induced fall of a weighted ball through the material being tested over a selected period of time. This test is generally performed in a laboratory on samples of dope obtained from a manufacturing area and, naturally, results in a considerable lag of time between collection of a sample and interpretation of test results. Thus, often times dope having off-specification viscosity has traveled some distance along the manufacturing process before the deficiency is noted and its cause corrected.

These difficulties are overcome in the instant invention which is directed to an automatic, continuous viscometer utlizable with ultra-viscous materials by maintaining a relatively obstruction free passageway through the instrument. This is accomplished by placing a pair of pressure measuring devices mounted flush with the walls of a pair of pressure chambers at each end of a capillary tube having a known radius and length. Since the flow through the tube and pressure chambers is constant and unobstructed, there is little possibility of plugging or "gunking up." The readings of the pressure transducers are fed to a difference amplifier which produces a signal that is the difference between these two readings and, therefore, a direct indication of the pressure drop across the tube. This pressure drop is linear with the viscosity of the liquid if all other factors of the aforementioned Poiseuille's equation are held constant.

If the viscosity reading is to be accurate, the rate of liquid flow through the system must be uniform and the temperature of the liquid must be held constant. A uniform flow rate is maintained by utilizing a constant flow rate pump. To maintain a constant temperature the liquid is forced through a heat exchanger having an elongated narrow channel which passes viscous liquids rather freely and that is in continuous contact with a wall of heat transmitting material, one side of which is in contact with a controlled temperature fluid. The tube across which the pressure drop is to be measured is likewise maintained at a constant temperature by installing it within a jacket containing a fluid maintained at a constant temperature.

Accordingly, it is an object of this invention to provide a continuous automatic viscometer which can be used with all liquids including those which are ultra-viscous.

Another object of this invention is to provide a continuous automatic viscometer useful with ultra-viscous liquids in which a constant flow rate and liquids temperature are maintained.

Yet another object of this invention is to provide a continuous, automatic viscometer which is not susceptible of plugging or "gunking up" even though the viscosity of ultra-viscous liquids is being measured.

A further object of this invention is to provide a continuous, automatic viscometer in which the temperature of the liquid is maintained at a constant level by flowing it through a heat exchanger arranged to provide for relatively free passage even for ultra-viscous materials.

These and other objects and advantages of this invention will be more apparent upon reference to the following specification, appended claims and drawing wherein:

FIGURE 1 is a partly cross-sectional, partly diagrammatic view showing the arrangement of the heat exchanger, the pressure chambers, the capillary tube and the pressure sensing elements according to the instant invention; and FIGURE 2 is a diagrammatic view of the system for measuring viscosity according to the invention.

In order to better understand the construction and use of this novel viscometer it will be described in relation to the measurement of viscosity of an ultra-viscous dope to be utilized in the spinning of synthetic fibers. It is to be understood, however, that this novel device is equally useful where less viscous fluids such as, for example, oil, are involved. Other uses will be readily apparent to those skilled in the art.

With continued reference to the accompanying figures wherein like numerals designate similar parts throughout the various views, and with initial attention directed to FIGURE 1, reference numeral 10 designates generally the viscometer according to the instant invention including a heat exchanger 12, a measuring section 14, and a pair of pressure transducers 16 and 18. Constant flow rate pump 20 supplies the viscous liquid to the heat exchanger where it is brought to a desired temperature after which it passes through the measuring section 14 and is discharged through an outlet 22.

As best shown in FIGURE 1 the heat exchanger 12 includes an elongated casing 24 having an inlet passageway 26 at one end and an outlet passageway 28 at the other end. Inlet passageway 26 is connected through line 30 (indicated diagrammatically) to pump 20 which delivers the liquid to be tested at a constant flow rate. Connecting the inlet and outlet ends of the casing 24, is an elongated, hollow, cone-shaped tube 32 the wall of which is constructed of heat conducting material. Disposed within the tube is an elongated, cone-shaped core 34 having a continuous helical groove 36 cut into its outer surface. This groove provides a passageway, one side of which is open when the core 36 is removed from the tube 32, from one end of the core to the other. When installed, the core 36 fits closely to the interior of the wall of the tube 32 so that a channel is formed having one side as the wall of the tube 32. This channel provides an avenue from the inlet 26 to the outlet 28 in which the liquid carried therein is in continuous contact with tube wall 32. While many variations in dimensions are permissible, it has been found that a groove ⅛ of an inch deep and arranged to provide a channel approximately 48 inches long is satisfactory.

At the inlet end of the casing 24, an enlarged, threaded aperture 38 provides access to the interior of the tube 32. As shown in FIGURE 1 a hold down nut 40 threaded into aperture 38 acts through a spacer 42 to maintain the core 34 securely in place. An end plate 44 closes the aperture 38 and is held in place on the inlet end of the casing 24 by bolts 46. The outlet passageway 28 of the heat exchanger 12 is tapered as at 48 to provide a stop against which the core 34 is wedged.

A portion of the outlet end of the casing 24 is formed into a protuberance 50 and a flange 52. The protuberance 50 is fitted into a complementary indentation formed on the measuring section 14 while the flange 52 provides a base to which one end of a cylindrical tube 54 is welded or otherwise suitably secured. The other end of the tube 54 is likewise suitably secured to a lip 56 formed on the inlet end of the casing 24. This tube 54 provides a fluid tight jacket concentric and coextensive with the casing tube 32. An inlet nipple 58 connected to a source of heated fluid, preferably hot water, is provided at one end of the jacket while an outlet nipple 60 is provided at the other. Thus, a continuous circulation of heated fluid, the temperature of which is constantly and accurately regulated, is available to surround the heat exchanger tube 32.

The outlet passageway 28 of the heat exchanger 12 exits into a cylindrical pressure chamber 62 formed within a first pressure transducer mounting block 64. As clearly shown in FIGURE 1, the heat exchanger 12 is secured to the mounting block 64 by means of bolts 66 threaded into the block 64 and extending through outwardly extending mounting ears 68 suitably secured as by welding to the exterior surface of the cylindrical tube 54. Similarly, the pressure transducer 16 is secured in place by bolts 70 extending through a flange 72 thereon and threaded into the mounting block 64. The pressure sensitive element 74 of the transducer 16 is mounted within an aperture 76 extending through the wall of the mounting block 64 into the pressure chamber 62. Pressure sensing element 74 is of the flush diaphragm type and is mounted flush with the wall surrounding the mouth of the aperture 76. By so placing the pressure sensing element 74 the problem of plugging or "gunking up" is avoided since the liquid being observed may flow freely through the pressure chamber without encountering irregular obstructions to which it can adhere.

A second pressure chamber 78 is formed within the pressure transducer mounting block 80. Pressure transducer 18 is secured in position by bolts 82 extending through flange 84 and threaded into block 80. Similarly to pressure transducer 16, the pressure sensing element 86 of pressure transducer 18 is mounted flush with the mouth of aperture 88 extending through the wall of the mounting block 80 into the pressure chamber 78. Thus, again the free flow of liquid is assured due to the elimination of obstructions in its path.

An elongated tube 90 extends through an exit opening 92 from pressure chamber 62 and also through an entrance opening 94 into the pressure chamber 78. Disposed within the tube 90 is a capillary 96 having an accurately known radius and length.

One end of the capillary 96 extends outwardly from the tube 90 into the pressure chamber 78 and is surrounded by and secured to a hollow bolt 98 threaded into a recess 100 adjacent the entrance opening 94. The outer end 102 of the bolt 98 is formed in the shape of a hexagon so that it may be positively gripped by a removing wrench, rotated, and disengaged from the threads in the recess 100. The capillary 96 and its associated bolt 98 can be completely withdrawn from the viscometer 10 by removing bolts 103 which secure the flange to end plate 104 covering an access opening 106. The removable feature allows the use of capillaries having various bore radii. In this manner, the accuracy of the viscometer can be maintained at a high level with liquids of varying viscosities.

The interchangeability of capillary 96 enables the use of this novel viscometer with liquids having a wide range of viscosities. It has been utilized, as explained before, with 100 to 5000 poise synthetic dopes from which fibers are spun merely by selecting the proper capillary aperture. In a similar manner it can as well be applied to low viscosity material. Selection of the capillary is obtained generally empirically by observing the pressure drop differential until it is sufficient to give an accurate and meaningful reading.

Details of the pressure transducers have not been discussed inasmuch as a variety of commercially available devices may be utilized. It is important, as discussed above, that the sensing element be of the flush diaphragm type to provide for a free, smooth flow of liquid through pressure chambers 62 and 78. While not limited thereto, one transducer which has been found to be satisfactory is Swartwout Model P3T.

In order to maintain the temperature of the liquid being tested for viscosity constant, that portion of tube 90 extending exteriorly of the two mounting blocks 64 and 80 is jacketed by a short cylinder 108. This cylinder is fluid tightly secured to the mounting blocks 64 and 80 by welding, or other suitable securing methods, to struck-out ring portions 110 and 112 on mounting blocks 64 and 80 respectively. Support and correct alignment of the tube 90 and cylinder 108 is provided by a disc 114 mounted interiorly of the jacket formed by the cylinder 108.

Fluid withdrawn from outlet nipple 60 is transported to the jacket formed by cylinder 108 through line 116 (indicated diagrammatically) to provide the proper temperature environment therein. This fluid enters through a passageway 118, circulates within the cylinder 108, and exits therefrom through passageway 120 to be reheated.

The liquid, the viscosity of which is to be measured, is maintained at the desired uniform, constant temperature through the use of an automatic control system illustrated in FIGURES 1 and 2. As clearly shown in FIGURE 1 the temperature of the liquid emerging from capillary 96 is continuously monitored by a thermocouple 122 threaded into the end plate 104 and including a probe 124 extending through an end plate opening 126. The liquid is brought into intimate contact with the probe 124 by a hollow extension 128 on the bolt 98 which extends outwardly to surround the tip of the probe. As shown in FIGURE 2, the signal from thermocouple 122 is transmitted through an amplifier 130 to a combined recorder and regulator 132. If the temperature of the liquid should vary from that desired, the regulator 132 signals a control valve which, as illustrated, regulates the amount of heating steam introduced into a heat exchanger 136 that functions to supply heated water to the jackets formed by tube 54 and cylinder 108 thus, maintaining the temperature of the liquid at a desired level.

While the viscometer system has been discussed above in terms of heating the liquid, it can as well be utilized where it is deemed necessary to cool the liquid being measured before determining its viscosity. In such a case the fluid supplied through control valve 134 will be one that is cooled rather than heated and will serve to extract rather than introduce heat to the fluid being circulated in the jackets formed by the tube 54 and cylinder 108.

The signals produced by pressure transducers 16 and 18 are transmitted to a difference amplifier 138 which subtracts one from the other. The resultant signal is a direct indication of the pressure drop across the capillary 96. This signal is fed to the recorder 132 which reduces it to a visual indication that is directly correlatable with viscosity as explained below.

According to Poiseuille's pressure drop equation:

$$\mu = \frac{\pi R^4 gc(\Delta P)C}{8LQ}$$

where:

$\mu$ = absolute viscosity (in poises)
$R$ = radius of capillary (feet)
$gc$ = gravitational constant (feet/second squared)
$P$ = differential pressure across the capillary (pounds/foot$^2$)
$L$ = length of capillary (feet)
$Q$ = flow rate (feet$^3$/second)
$C$ = constant to convert pounds/foot-seconds to poises If all factors are held constant, $\Delta P$ will vary linearly with $\mu$.

In applying this equation to the viscometer which is the subject of the instant invention, it is seen that R, gc, L, and C are all constant. Since the temperature and flow rate Q are also held constant, an indication of $\Delta P$ will be an indication of the viscosity. Thus, the difference signal obtained from recorder 132 may be utilized in the above formula to compute the viscosity reading or, alternatively, may be introduced to another instrument which will by its nature give a direct reading of viscosity.

Poiseuille's equation is applicable to Newtonian fluids; therefore, direct readings and calculations of viscosity can be obtained utilizing this novel instrument only on such fluids. The viscometer is useful, however, as a control instrument and to obtain readings leading to the determination of viscosity of non-Newtonian fluids. For example, the instrument has been found to give useful indications of viscosity changes in pseudoplastic fluids such as acrylic and spandex spinning dopes. Further, since non-Newtonian fluids behave in much the same manner as Newtonian fluids at low shear rates, the pressure drop through the viscometer is a reliable indicator of viscosity in this limited instance even though the liquid is non-Newtonian.

In addition to utilizing the instrument as a control and for obtaining a reading of liquid viscosity, it can also produce a signal feed-back to earlier stages of the production process to correct the cause of variance in viscosity. In this application the factors which control viscosity, such as percent solids, percent solvent, and others can be manipulated until viscosity returns to an acceptable range. Thus, the viscometer which is the subject of the invention finds application not only in a laboratory but can be applied to actual automated production.

It will be apparent that by utilizing the apparatus described above, a continuous, automatic viscometer useful with ultra-viscous as well as normally viscous liquids can be constructed. This is possible because of the use of pressure transducers utilizing flush diaphragm sensors and a unique helical groove heat exchanger to reduce the number and volume of passages and chambers where stagnant dope can solidify and plug the unit. Furthermore, the unique helical groove heat exchanger is used to provide minimum hold-up time and uniform heat transfer from the water jacket to the dope. The viscometer is short and compact resulting in a reduction in the length and volume of the dope passageway to materially reduce dope flow hold-up time thus increasing the speed of response of the viscosity indication. By using this invention the slow "ball fall" measurement system can be eliminated and replaced with an accurate, simple, reliable, sturdy, non-drifting reproducible means of measuring in a short time the viscosity of synthetic resins and other viscous liquids.

The invention may be embodied in other specific forms without departing from the spirit or essential characteristics thereof. The present embodiment is therefore considered to be in all respects as illustrative and not restrictive, the scope of the invention being indicated by the appended claims rather than by the foregoing description, and all changes which come within a meaning and range of equivalency of the claims are therefore intended to be embraced therein.

We claim:
1. Apparatus for determining the viscosity of a liquid comprising:
    (a) first and second spaced apart pressure chambers;
    (b) an elongated tube connecting said chambers whereby the liquid, the viscosity of which is to be measured can flow therethrough;
    (c) pressure differential measuring means including a sensing element mounted in each of said pressure chambers substantially flush with a wall thereof for measuring the pressure drop across said tube;
    (d) a liquid outlet in one of said chambers;
    (e) a liquid inlet in the other of said chambers;
    (f) a heat exchanger including a hollow casing having a wall, means in said casing forming an open-sided passageway, said casing wall closing said passageway open side to form a channel through said heat exchanger connected at one end to said liquid inlet;
    (g) means for maintaining said wall at a selected temperature; and
    (h) means for supplying a constant volume of the viscous liquid to said channel whereby said liquid will contact said wall and substantially attain the temperature of said wall so that the measure of pressure drop across said tube will be a direct indication of the viscosity of said liquid.

2. Apparatus for determining the viscosity of a liquid comprising:
    (a) first and second spaced apart pressure chambers;
    (b) an elongated tube connecting said chambers whereby the liquid, the viscosity of which is to be measured, can flow therethrough;
    (c) pressure differential measuring means including a sensing element mounted in each of said pressure chambers substantially flush with the walls thereof for measuring the pressure drop across said tube;
    (d) a liquid outlet in one of said chambers;
    (e) a liquid inlet in the other of said chambers;
    (f) a heat exchanger including a hollow casing having a wall, a core closely fitted into said hollow casing, a groove in the outer surface of said core, said casing wall and said groove forming a channel through said heat exchanger connected to said liquid inlet;
    (g) means for maintaining said wall at a desired temperature; and
    (h) means for supplying a constant volume of a liquid, the viscosity of which is to be measured, to said channel whereby said liquid will contact said wall and substantially attain the temperature of said wall so that the measure of pressure drop across said tube will be a direct indication of the viscosity of said liquid.

3. Apparatus according to claim 2 wherein said channel is helical in form.

4. Apparatus for determining the viscosity of a liquid comprising:
    (a) first and second spaced apart pressure chambers;
    (b) an elongated tube connecting said chambers whereby the liquid, the viscosity of which is to be measured, can flow therethrough;
    (c) pressure differential measuring means including a sensing element mounted in each of said pressure chambers substantially flush with a wall thereof for measuring the pressure drop across said tube;
    (d) a liquid outlet in one of said chambers;
    (e) a liquid inlet in the other of said chambers;
    (f) a heat exchanger including a hollow casing having a wall, a core closely fitted into said hollow casing, a helical groove in the outer surface of said core, said casing wall and said groove forming a helical channel through said heat exchanger connected to said liquid inlet;
    (g) a jacket surrounding said casing for maintaining said casing wall in contact with a fluid;
    (h) means for maintaining said fluid at a preselected temperature whereby said casing wall will also be maintained at a selected temperature; and (i) means for supplying a constant volume of liquid, the viscosity of which is to be measured, to said helical channel whereby said liquid will contact said wall and substantially attain the temperature of said wall so that the measure of pressure drop across said tube will be a direct indication of the viscosity of said liquid.

5. Apparatus for determining the viscosity of a liquid comprising:
(a) first and second spaced apart pressure chambers;
(b) an elongated tube connecting said chambers whereby the liquid, the viscosity of which is to be measured, can flow therethrough;
(c) pressure differential measuring means including a sensing element mounted in each of said pressure chambers substantially flush with a wall thereof for measuring the pressure drop across said tube;
(d) a liquid outlet in one of said chambers;
(e) a liquid inlet in the other of said chambers;
(f) a heat exchanger including a hollow, cone-shaped casing having a wall, a cone-shaped core closely fitted into said hollow casing, a helical groove in the outer surface of said core, said casing wall and said groove forming a helical channel through said heat exchanger connected to said liquid inlet;
(g) a jacket surrounding said casing for maintaining said casing wall in contact with a fluid;
(h) means for maintaining said fluid at a pre-selected temperature whereby said casing wall will also be maintained at a selected temperature; and
(i) means for supplying a constant volume of liquid, the viscosity of which is to be measured, to said helical channel whereby said liquid will contact said wall and substantially attain the temperature of said wall so that the measure of pressure drop across said tube will be a direct indication of the viscosity of said liquid.

6. Apparatus for determining the viscosity of a liquid comprising:
(a) first and second spaced apart pressure chambers;
(b) a first elongated tube connecting said chambers;
(c) an elongated capillary having a known length and aperture radius removably disposed within said first tube to form a conduit between said first and second chambers through which the liquid, the viscosity of which is to be measured, can flow and whereby the cross-sectional area of said conduit can be varied according to the liquid being tested;
(d) pressure differential measuring means including a sensing element mounted in each of said pressure chambers substantially flush with the walls thereof for measuring the pressure drop across said capillary;
(e) a liquid outlet in one of said chambers;
(f) a liquid inlet in the other of said chambers;
(g) a heat exchanger including a hollow, cone-shaped casing having a wall, a cone-shaped core closely fitted into said hollow casing, a helical groove in the outer surface of said core, said casing wall and said groove forming a helical channel through said heat exchanger connected to said liquid inlet;
(h) a jacket surrounding said casing for maintaining said casing wall in contact with a fluid;
(i) means for maintaining said fluid at a pre-selected temperature whereby said casing wall will also be maintained at said selected temperature; and
(j) means for supplying a constant volume of liquid to said channel whereby said liquid will contact said wall and substantially attain the temperature of said wall so that the measure of pressure drop across said tube will be a direct indication of the viscosity of said liquid.

7. Apparatus for determining the viscosity of a liquid comprising:
(a) first and second spaced apart pressure chambers;
(b) a first elongated tube connecting said chambers;
(c) an elongated capillary having a known length and aperture radius removably disposed within said first tube and forming a conduit between said first and second chambers through which the liquid, the viscosity of which is to be measured, can flow whereby the cross-sectional area of said conduit can be varied according to the liquid being tested;
(d) a jacket surrounding said first tube for maintaining it in contact with a fluid;
(e) pressure differential measuring means including a sensing element mounted in each of said pressure chambers substantially flush with the walls thereof for measuring the pressure drop across said tube;
(f) a liquid outlet in one of said chambers;
(g) a liquid inlet in the other of said chambers;
(h) a heat exchanger including a hollow, cone-shaped casing having a wall, a cone-shaped core closely fitted into said hollow casing, a helical groove in the outer surface of said core, said casing wall and said groove forming a helical channel through said heat exchanger connected to said liquid inlet;
(i) a jacket surrounding said casing for maintaining said casing wall in contact with a fluid;
(j) means for maintaining the fluid in said tube and casing jackets at a pre-selected temperature whereby said tube and said casing wall will also be maintained at said selected temperature; and
(k) means for supplying a constant volume of liquid to said channel whereby said liquid will contact said wall and substantially attain the temperature of said wall so that the measure of pressure drop across the tube will be a direct indication of the viscosity of said liquid.

References Cited
UNITED STATES PATENTS

| | | | |
|---|---|---|---|
| 2,771,770 | 11/1956 | Bouman | 73—55 |
| 3,020,026 | 2/1962 | Peeps et al. | 165—156 |
| 3,024,642 | 3/1962 | Jones | 73—54 |

DAVID SCHONBERG, *Primary Examiner.*